Oct. 29, 1957   F. S. ALLINQUANT   2,811,226
SHOCK ABSORBERS OF THE DIRECT ACTING TYPE
Filed Jan. 10, 1956   4 Sheets-Sheet 4

United States Patent Office 2,811,226
Patented Oct. 29, 1957

2,811,226

SHOCK ABSORBERS OF THE DIRECT ACTING TYPE

Fernand Stanislas Allinquant, Paris, France

Application January 10, 1956, Serial No. 558,380

Claims priority, application France January 10, 1955

1 Claim. (Cl. 188—88)

My invention relates to hydraulic shock absorbers of the direct acting type to be used particularly for damping a wheel suspension of a car and in which a single piston is moving into a single cylinder structure. In a known construction of shock absorbers of that type the upper part of the cylinder structure comprises a compensation chamber and is to be attached to the frame of the car; the piston, which is formed with oil passages controlled by valves, operates in a lower part of said structure forming its working chamber and the piston rod passing a sealing joint is to be attached to the axle of a wheel. The working chamber is completely filled with oil and the compensation chamber only partly, its function being to receive or restitute upon the movements of the piston the volume of oil displaced by the piston rod, a wall of the compensation chamber comprising oil passages connected to the working chamber and controlled by valves.

My invention has for its object a shock absorber of the type described in which both the oil passages controlled by valves through the piston and through a partition between the cylinder and the upper compensation chamber are designed in a manner which will prevent any disturbance in the flow of oil therethrough, which would result in cavitation or emulsion of air in the oil, particularly when passing said partition. A further object of my invention is to provide a shock absorber, which is easy and economical to manufacture. A still further object of my invention is to provide a construction of a shock absorber of the type described, in which the fixed lengths of the piston and of the partition are held to a minimum thus permitting their use in very short shock absorbers.

The various features of my invention are embodied in the construction shown on the drawings, in which:

Figure 1, in two parts 1a and 1b, is a longitudinal section of my improved shock absorber;

Figure 1A:
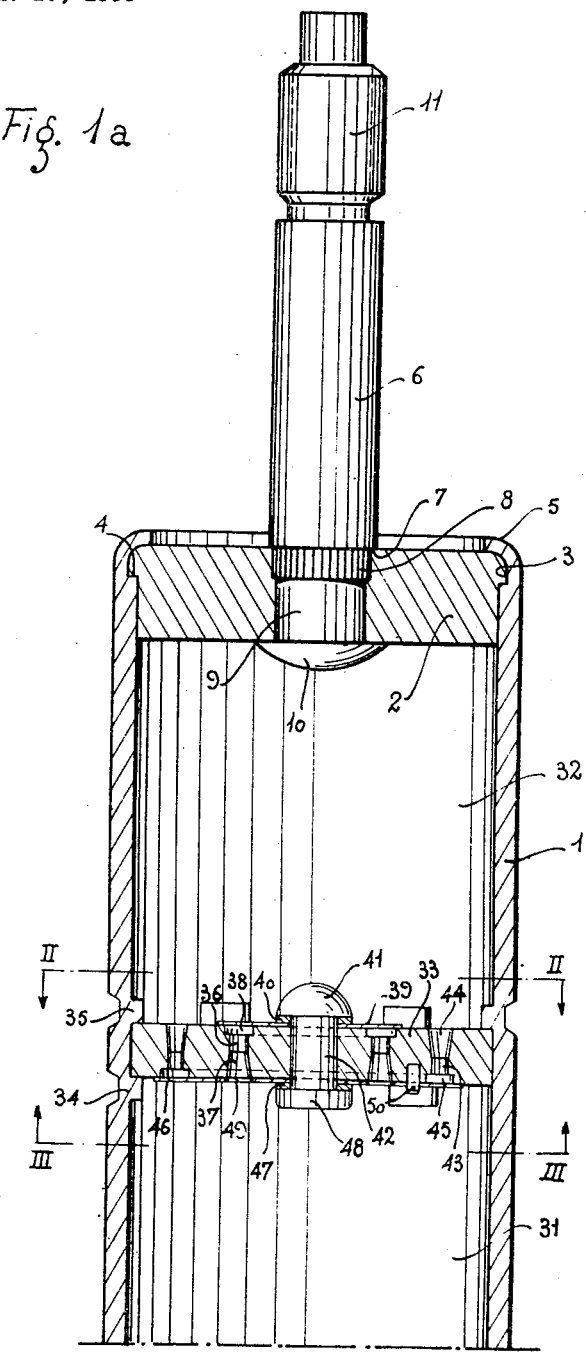
Figure 1B:
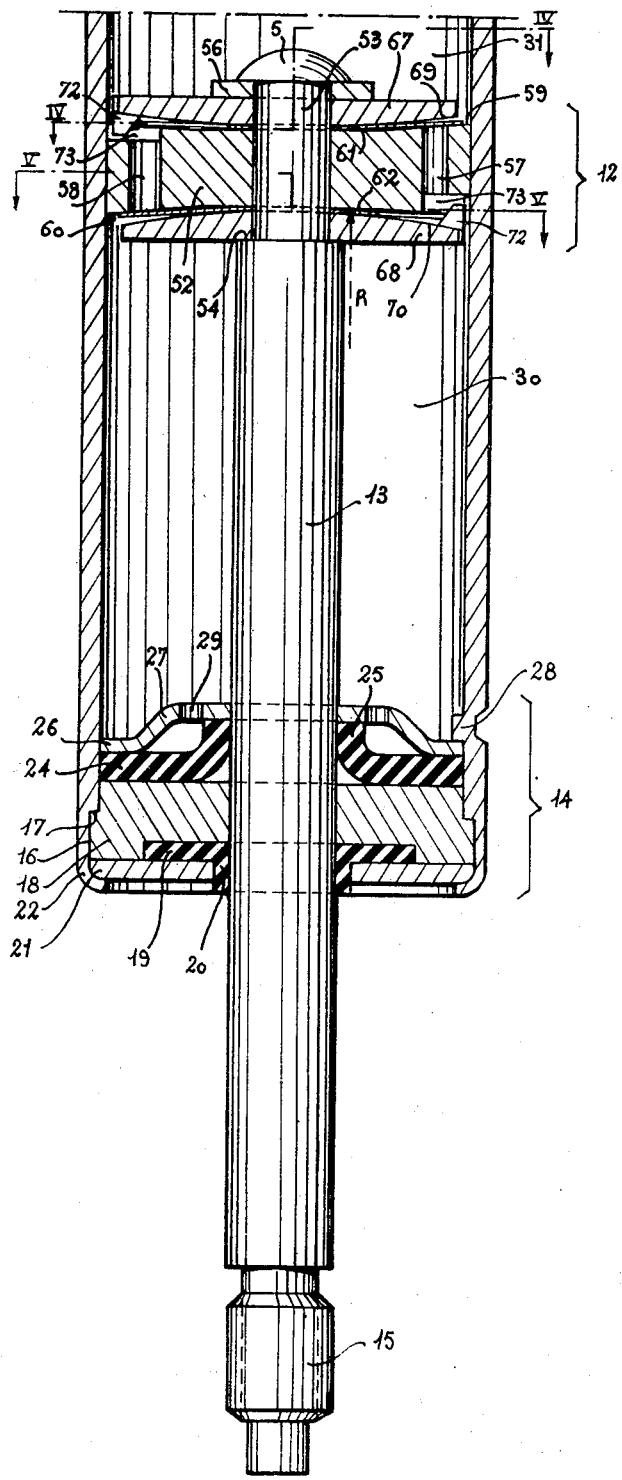

The cylinder structure is formed by a tube 1 (Figure 1). The upper end of this tube (Fig. 1a) is closed by a circular part 2 press-fitted into a bored end portion 3 of said tube and engaging a shoulder 4 at the bottom of said portion, and by coining end 5 of tube 1. Part 2 has an axial stud 6 fixed thereto. The lower portion of said stud comprises below a shoulder 7, a serrated portion 8 and a smooth portion 9. This stud is press-fitted into a central bore of part 2 and its end 10 is riveted. Stud 6 threaded at 11 provides attachment of the cylinder structure to the frame of a car.

The sealing qualities of this assembly have been made by the press-fitting of the parts as described; however it can also be enhanced by a circular joint placed on shoulder 4 prior to engaging part 2 into the end of the tube.

The tube 1 (Fig. 1b) forms in its lower part a cylinder for a piston assembly 12 having a rod 13, passing through a guiding and sealing assembly 14, held into the lower part of tube 1. Piston rod 13 is to be attached to the axle of a wheel.

The assembly 14 held in the counterbore 16 against a shoulder 17 comprises a guiding part 18 for the piston rod. The external face of part 18 holds a resilient washer 19 having a collar 20 which contacts the piston rod 13 and operates to wipe dirt from said rod 13. Washer 19 is held by a flat washer 21 and the assembly held by coining at 22.

Oil seepages are prevented by washer 24 which can be made of rubber or any synthetics. When free its outside diameter is slightly greater than diameter of tube 1, and its inside diameter much smaller than the diameter of the piston rod 13. When assembled this washer 24 is radially compressed forming around piston rod 13 a resilient collar 25. Resilient washer 24 is axially compressed on its periphery between washer 18 and a flat peripheral lip 26 of a hollow washer 27, held there by indentations 28 into tube 1. The depth of washer 27 is such as to hold the upper end of resilient washer 25. Metallic washer 27 is perforated and has a series of holes 29, which allow the inner pressure to operate onto collar 25 upon the downward movement of piston 12, thus compressing this collar 25 and therefore improving its sealing qualities.

Figure 2:
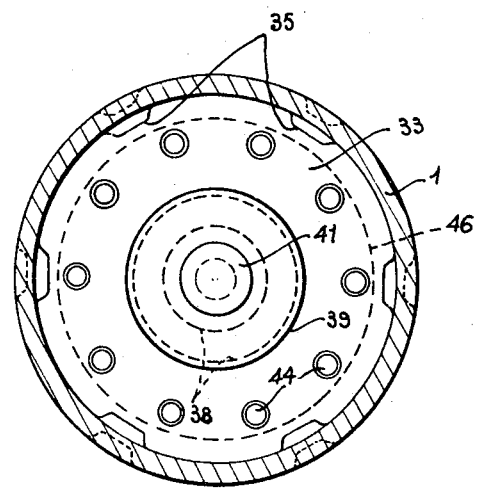
Figure 2 is a cross section following lines II—II of Figure 1.
Figure 3:
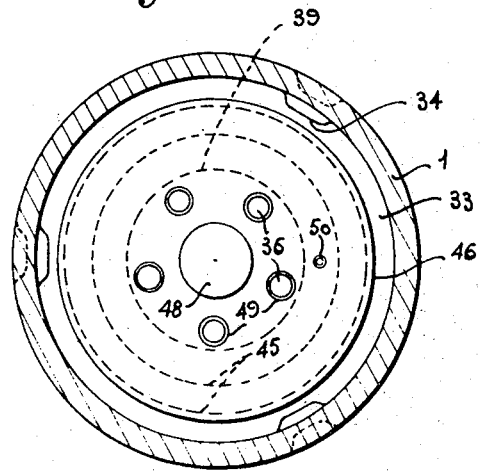
Figure 3 is a cross section following lines III—III of Figure 1.

The height of the tube 1 is divided into two chambers, a lower one of a greater length forming the cylinder, which in turn is divided by piston 12 into two spaces 30 and 31, and an upper chamber of shorter length 32, called compensation chamber, by means of a partition 33. This partition (Fig. 1a and 2, 3) is held in the tube by indentations 34 and 35. Oil passages therethrough are formed by two concentric series of perforations covered by valves.

Perforations 36 will ensure the passage of oil from the working cylinder into the upper chamber or compensation chamber. These holes have a convergent portion 37 extending from their entry to a cylindrical portion opening into a circular groove 38. This groove is covered by a circular resilient washer having its outside diameter slightly greater than the outside diameter of this groove and held there by a washer 40 on which a head 41 is formed on rivet 42. The surface against which valve 39 is held is slightly concave (included angle being thirty minutes for example), which ensures an elastic deformation for a given pressure on the valve against its seat and a tight seal of groove 38.

Perforated holes 43 will ensure the return of oil from the compensation chamber into the working cylinder upon the downward movement of piston 12. The perforations 43 have likewise a conical portion 44 converging downwardly into a circular groove 45. Against groove 45 is a resilient disc of circular shape having its outside diameter slightly greater than the outside diameter of that groove held there by washer 47 and rivet head 48. The surface against which resilient washer 46 is held is also slightly conical (15 minutes for example) thus ensuring a tight closing of valve 46. This valve 46 has a series of holes 49, which coincide with holes 37 thus permitting the oil flow from the working chamber against valve seat 39. Valve 39 will allow only the oil displaced by the entering portion of the piston rod into the compensation chamber and no more, valve 46 will allow a free compensating return of oil from the compensation chamber into the working cylinder upon the slightest movement of piston rod 13.

The piston (Fig. 1b) comprises a cylindrical body 52, the diameter of which except for the necessary clearance corresponds to the inner diameter or the bore of the cylinder, in which the piston is operable. This body is secured to the piston rod 13 by fitting onto a machined end part 53 of said rod. The piston assembly 12, which includes the body 52 as its middle part and on either side thereof other parts which are to be described below, is clamped against the shoulder 54 obtained from machining the part 53, by riveting a head 55 from the protruding end portion of that part 53 onto a washer 56.

Figure 4:
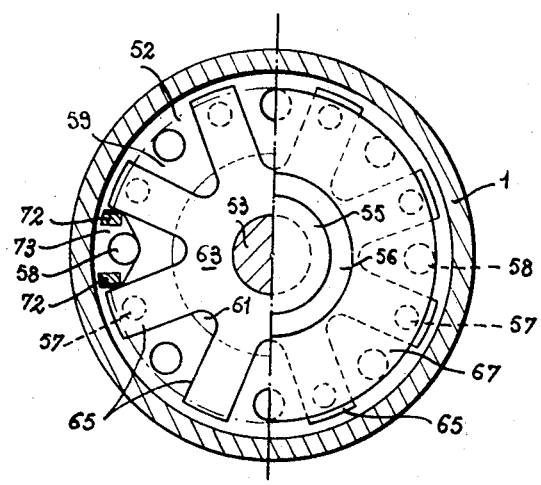
Figure 4 is a cross section following lines IV—IV of Figure 1.
Figure 5:
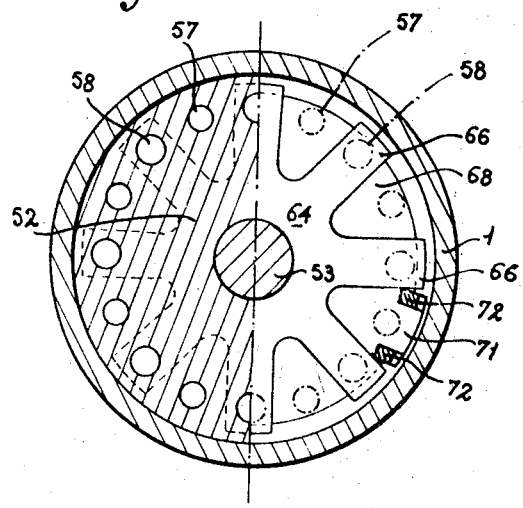
Figure 5 is a cross section following lines V—V of Figure 1.

On a common circular row two groups of alternate perforations of different diameters are bored through the piston body 52 (Figs. 4 and 5). The perforations 57 of one group are of smaller diameter and provide oil passages during the rebound stroke of the piston, the perforations 58 of the other group are of a larger diameter and provide oil passages during the compression stroke. On both faces of the piston body the perforations 57, 58 open in a conical surface portion 59 or 60 having a very small slope, the central surface portion 61 or 62 being plane. The perforations 57 are covered on the face of the piston body remote from the piston rod 13, the perforations 58 on the opposite face, by means of a resilient star-shaped valve 63 or 64, the branches 65 or 66 of which have a constant width, act as resilient valves for the alternate perforations 57 or 58 and leave uncovered the intermediate perforations 58 or 57. Both said resilient star-shaped valves may have similar or different elastical characteristics. They are turned angularly in relation to each other an angle equal to the angular space between two adjacent perforations.

Each resilient star-shaped valve, which is plane when free is centrally bored to fit on rod part 53 and its central portion 63 or 64 is clamped onto the central plane surface portion 61 or 62 of the relevant face of the piston body by the plane central surface of a backing piece 67 or 68. The clamping has for its effect to bend the branches 65 or 66 the ends of which engage the conical surface 59 or 60 of the piston body and to give them a predetermined pressure against said surface. The central portion 63 or 64, thus clamped between the plane surfaces 61 or 62 of the piston body 52 and the plane central surfaces of the backing piece 67 or 68, act as an embedded portion in respect to the peripheral portion. The branches 65 or 66 or valves operate by mere flexion and the value of their elastical thrust against the conical surfaces 59 or 60 defines the minimal differential pressure in the covered passages, which is necessary to unseat said valves.

For the perforations being tightly closed, the conical surfaces 59 and 60 are tangential to the branches 65 or 66 as bent at a point located on the axis of any of the perforations. Practically the slope of the conical surfaces 59 and 60 should be chosen of an angle approaching one degree, for instance forty-five minutes and their axial position should be as such, that their radial distances from the intersection with plane face 61 or 62 and from the axis of hole 57 or 58 to the end of the embedded portion of the resilient star-shaped valves should be related to each other as 2 to 3. Since the star-shaped resilient valves when cut are not perfectly flat, a pre-tension will ensure a tight closing of their branches against their respective orifices. However, to prevent an undesirable dispersion of pressure for the slow movements of the piston, I have provided, for each direction of oil flow a substantial number of passages and corresponding branches of the star-shaped valves. Experience proves that a star-shaped valve with 8 branches gives a dispersion of about 10%.

The plane surface of each backing washer 67 or 68 has toward its outside diameter a toric surface 69 or 70, tangent to this plane surface and having a generating circle of rather great value. The branches of the star-shaped valves, when deflected, will contact these surfaces and their deformation will be an arc of circle with a uniform stress. It can be seen that the elastic limit can be restrained to such an extent as to never reach their maximum stress.

The value of that curvature governing the stress of the star-shaped valve is a function of the thickness of that valve. Experience shows that for a valve of $4/10$ mm. and a stress of 50 kg./mm.$^2$ the radius R should be around 80 mm.

To ensure at the time of the assembly that each hole will be properly covered by the star-shaped valves, each backing washer 67 or 68 has a radial extension 71 and on the convex surface thereof there are provided two teeth 72, which engage a corresponding recess 73 of the piston body on both sides of an orifice uncovered by the star shaped-valve. The adjacent branches of the star-shaped valve can be in contact with these teeth, the width of the teeth being smaller than the width of star-shaped valve branches, so to prevent any error at the time of their assembly.

This shock absorber has its upper part fixed to the frame of the automobile and the piston rod to the axle of a wheel. At rest, and when the car has no passenger, the piston is about at ⅓ from the bottom of its travel in the working cylinder. A reserve of oil is provided into the compensation chamber.

During the compression stroke oil contained into space 31 of the working cylinder, will be displaced by the movement of the piston through apertures 58 and valves 66, which oppose a given resistance thus a dampening effect. This oil will enter space 30 under the form of a thin film without any turbulence. During this operation a volume of oil equal to the volume displaced by the piston rod entering space 30 will enter the compensating chamber 32 through the valve 46 by means of the apertures 49, then through orifices 36 and valve 39. This oil will enter the compensating chamber without any turbulenec in such a way as to prevent emulsion of air into the oil.

During the rebound stroke, the piston will move downwardly thus compressing the oil contained in space 30. This oil will flow through orifices 57 and enter space 31 also under the form of a thin film without any turbulence by deflecting valves 65. The loss of oil volume due to the portion of the piston rod disengaged from the working cylinder, will be compensated by the compensating chamber. The air contained about it being under a slight pressure a portion of this oil will pass the partition 33 through orifices 43 under the form of a thin film without any turbulence into space 31 of the working cylinder.

Experience has proved that such a compensating chamber and piston will not give birth to any turbulence and emulsion, thus no fading of the dampening power of a shock absorber showing the features described. This dampening power can be ascertained for any automobile vehicle by the flexing resistance of the star-shaped valves.

Another advantage of my invention is that its component parts are extremely simple thus very economical to produce, also their small fixed lengths will increase the travel length of the piston for a given length of the working cylinder.

What I claim is:

In a hydraulic shock absorber of the direct acting type, having a tubular member closed at its upper end forming an upper compensation chamber and a lower cylinder, and a piston defining in said cylinder an upper space and a lower space, and operable by means of a rod passing through said lower space and through a sealing device at the lower end of said cylinder, said piston comprising a cylindrical body rigidly clamped on said rod and slidably engaging said cylinder and formed on each face with a plane central surface portion and a conical peripheral surface portion and between said faces with a circular row of alternate perforations of smaller and larger diameters opening on each face of the piston in said conical surface portions and forming two groups of passages through said piston from one space to the other space of said cylinder, on each face of said piston body a resilient sheet valve for one group of perforations shaped around a plane central portion with radial branches of constant width corresponding in number to the perforations of said one group and angularly spaced to cover the perforations of said one group and to uncover the perforations of the other group, and on the outer face of said valve a disc having a plane central surface clamping the central portion of said valve against the plane central surface portion of said body, a divergent peripheral toric surface forming a backing to the branches of said valve when deflected, and a pair of teeth projecting inwardly from said toric surface and adapted to engage the sides of adjacent branches of said valve on each side of a perforation uncovered by said valve and extending into a recess in said body for retaining said valve against rotation, a fixed partition in said tubular member between said compensation chamber and said cylinder, formed with inner and outer circular rows of perforations, two resilient valves on the opposite faces of said partition, rigidly secured at their center and seated on said partition, one of said valves facing said chamber and covering with its peripheral portion the perforations of the inner row, the other facing said cylinder and covering with its peripheral portion the perforations of the outer row and formed with openings registering with the perforations of the inner row.

References Cited in the file of this patent

UNITED STATES PATENTS

| | | |
|---|---|---|
| 2,346,275 | Read et al. | Apr. 11, 1944 |
| 2,748,898 | Carbon | June 5, 1956 |
| 2,757,762 | Carbon | Aug. 7, 1956 |

FOREIGN PATENTS

| | | |
|---|---|---|
| 1,084,675 | France | July 13, 1954 |